US009107061B2

(12) United States Patent
Montemurro et al.

(10) Patent No.: US 9,107,061 B2
(45) Date of Patent: *Aug. 11, 2015

(54) SYSTEM AND METHOD FOR MULTIMEDIA EMERGENCY ACCESS IN A WIRELESS NETWORK

(71) Applicant: Blackberry Limited, Waterloo (CA)

(72) Inventors: Michael Peter Montemurro, Mississauga (CA); Stephen McCann, Rownhams (GB)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/298,270

(22) Filed: Jun. 6, 2014

(65) Prior Publication Data

US 2014/0286198 A1  Sep. 25, 2014

Related U.S. Application Data

(63) Continuation of application No. 12/898,844, filed on Oct. 6, 2010, now Pat. No. 8,750,268.

(60) Provisional application No. 61/266,874, filed on Dec. 4, 2009.

(51) Int. Cl.
*H04W 4/22* (2009.01)
*H04M 1/725* (2006.01)
(Continued)

(52) U.S. Cl.
CPC .............. *H04W 4/22* (2013.01); *H04L 65/1096* (2013.01); *H04M 1/72536* (2013.01); *H04W 48/14* (2013.01); *H04W 76/007* (2013.01); *H04M 2250/06* (2013.01); *H04W 84/12* (2013.01)

(58) Field of Classification Search
CPC ..... H04W 4/22; H04W 48/14; H04W 76/007; H04W 84/12; H04L 65/1096; H04M 1/72536; H04M 2250/06
See application file for complete search history.

(56) References Cited

U.S. PATENT DOCUMENTS

| 8,750,268 B2 | 6/2014 | Montemurro et al. |
| 2008/0151796 A1 | 6/2008 | Jokela |

(Continued)

FOREIGN PATENT DOCUMENTS

| JP | 2010532619 A | 10/2010 |
| WO | 2009005282 A1 | 1/2009 |

OTHER PUBLICATIONS

Schulzrinne, H., et al.; "Extensions to the Emergency Services Architecture for dealing with Unauthenticated and Unauthorized Devices"; ECRIT Internet-Draft; draft-schulzrinne-ecrit-unauthenticated-access-06.txt; Oct. 26, 2009; 23 pages.

(Continued)

*Primary Examiner* — Paul H Masur
(74) *Attorney, Agent, or Firm* — Conley Rose, P.C.; J. Robert Brown, Jr.

(57) ABSTRACT

A method for distributing multimedia emergency contact information using an access point of a wireless local area network (WLAN) is disclosed. The access point is configured to retrieve service contact information from a lookup table. The method includes receiving a first generic advertisement service (GAS) query from a WLAN device. The first GAS query includes a uniform resource name (URN) identifying at least one of the services. The method includes retrieving contact information for the at least one of the services identified in the first GAS query. The contact information includes a uniform resource identifier (URI). The URI is configured to include session initiation protocol (SIP) URIs, and telephone URIs. The method includes transmitting a GAS query response to the WLAN device. The GAS query response includes the contact information for the at least one of the services identified in the first GAS query.

15 Claims, 6 Drawing Sheets

(51) Int. Cl.
*H04W 48/14* (2009.01)
*H04W 76/00* (2009.01)
*H04L 29/06* (2006.01)
*H04W 84/12* (2009.01)

(56) References Cited

U.S. PATENT DOCUMENTS

| | | | |
|---|---|---|---|
| 2009/0010399 A1 | 1/2009 | Kim et al. | |
| 2009/0047922 A1 | 2/2009 | Buckley et al. | |
| 2009/0252165 A1 | 10/2009 | Zhang et al. | |
| 2009/0296688 A1 | 12/2009 | Bakker et al. | |
| 2009/0296689 A1 | 12/2009 | Bakker et al. | |
| 2009/0298458 A1 | 12/2009 | Bakker et al. | |
| 2010/0275249 A1* | 10/2010 | McCann et al. | 726/5 |
| 2011/0149938 A1 | 6/2011 | Bajko | |
| 2012/0243524 A1 | 9/2012 | Verma et al. | |

OTHER PUBLICATIONS

Rosen, B., et al.; "Framework for Emergency Calling using Internet Multimedia"; ECRIT Internet-Draft; draft-ieft-ecritframework-10; Jul. 27, 2009; 37 pages.
Bajko, Gabor; "Tutorial on Location and Emergency Services"; IEEE; Hawaii; Sep. 10, 2008; 45 pages.
McCann, Stephen, et al.; "Emergency URN Information"; IEEE P802.11; IEEE 802.11-1010026r2; Research in Motion Limited; Jan. 2010; 8 pages.
Yergeau, F.; "UTF-8, A Transformation Format of ISO 10646"; RFC 3629; Nov. 2003; 14 pages.
Schulzrinne, H.; "The tel URI for Telephone Numbers"; RFC 3966; Dec. 2004; 16 pages.
Camarillo, G.; "The Internet Assigned Number Authority (IANA) Uniform Resource Identifier (URI) Parameter Registry for the Session Initiation Protocol (SIP)"; RFC 3969; Dec. 2004; 6 pages.
Jennings, C.; Session Initiation Protocol (SIP) URIs for Applications such as Voicemail and Interactive Voice Response (IVR); Rfc 4458; Apr. 2006; 20 pages.
Office Action dated Nov. 16, 2012; U.S. Appl. No. 12/898,844, filed Oct. 6, 2010; 16 pages.
Final Office Action dated Mar. 11, 2013; U.S. Appl. No. 12/898,844, filed Oct. 6, 2010; 25 pages.
Notice of Allowance dated Jan. 31, 2014; U.S. Appl. No. 12/898,844, filed Oct. 6, 2010; 9 pages.
Taiwanese Office Action; Application No. 099138731; Dec. 16, 2013; 10 pages.
Taiwanese Office Action in Co-pending Application No. 099138731 on May 29, 2014; 2 pages. (No English translation available).
PCT International Search Report; Application No. PCT/IB2010/002932; May 9, 2011; 3 pages.
PCT Written Opinion of the International Searching Authority; Application No. PCT/IB2010/002932; May 9, 2011; 6 pages.
Canadian Office Action; Application No. 2,782,648; Jul. 9, 2014; 3 pages.
Chinese Office Action; Application No. 201080054933.9; Apr. 2, 2014; 15 pages.
Japanese Office Action; Application No. 2012-541591; Aug. 12, 2013; 5 pages.
Korean Office Action; Application No. 10-2012-7017052; Nov. 21, 2013; 9 pages.

* cited by examiner

SYSTEM AND METHOD FOR MULTIMEDIA EMERGENCY ACCESS IN A WIRELESS NETWORK

PRIORITY

This patent application claims priority to U.S. Ser. No. 12/898,844, filed on Oct. 6, 2010 (now U.S. Pat. No. 8,750,268 issued Jun. 10, 2014), which claims the benefit of U.S. Provisional Application No. 61/266,874 filed Dec. 4, 2009; each of which are hereby incorporated by reference in their entirety.

BACKGROUND

The present disclosure relates generally to emergency access in communication networks and more specifically to a system and method for provisioning multimedia emergency access contact information in a wireless network.

As used herein, the terms wireless local area network (WLAN) device and wireless device can refer to wireless devices such as mobile telephones, personal digital assistants, handheld or laptop computers, and similar devices or other user agents (UAs) that have telecommunications capabilities and are configured to communicate using a packet-switched (PS) network, for example, Bluetooth, Zigbee, UWB, WiMAX and any cellular technology. In some embodiments, a WLAN device may refer to a mobile, wireless device. The term WLAN device may also, in some cases, refer to devices that have similar capabilities but that are not generally transportable, such as desktop computers, set-top boxes, or network nodes. Throughout this disclosure, WLAN device may also refer to SIP (or similar multimedia communication protocols) devices such as wireless devices, wireless set-top boxes, or other wireless communication devices.

Some WLANs may be configured to provide voice-over-internet protocol (VoIP) services. Using such a network, various WLAN devices may be configured to communicate with one another to deliver voice communications. The WLAN devices may also be configured to communicate with conventional circuit-switched (CS) telephone networks via the WLAN. In addition to voice services, WLAN devices may also use the WLAN to deliver multimedia communications such as video-conference, text-messaging, multimedia messaging services, or other communication services. These networks may be configured to provide interworking information and services—thereby allowing WLAN devices to interwork with external networks, as typically found in hotspots or other networks irrespective of whether the service is subscription based or free. In some cases, interworking aids network discovery and selection, enabling information transfer from external networks, and enabling emergency services.

It is a requirement for VoIP service providers to provide their subscribers with the ability to quickly contact emergency services. Generally, the service providers must provide their subscribers with a single phone number that allows the subscriber to quickly contact local emergency services. The emergency contact number is provided to the subscriber by a hotspot or access device of the network to which the subscriber is connected and is based upon a geographical location of the subscriber—generally, the emergency contact number allows the subscriber to contact emergency services that are located nearby. In some cases, however, the emergency contact number is for a centralized service, which then connects the subscriber to appropriate emergency services. After the centralized control center is contacted, the user's call can be re-routed to a local first provider. This "tier" system is used in several countries and may be the basis of the 3GPP/LTE IMS system, for example. After the subscriber dials the emergency number, the network connects the user to a local public safety answering point (PSAP) associated with the telephone number. The PSAP can then communicate with the subscriber, and dispatch services to assist the subscriber.

In conventional telephone networks, there are several mechanisms for determining the location of a users handset, and, thereby, the most appropriate PSAP for the subscriber. If the handset is connected to a fixed line, for example, the provider may store a record indicating the physical address or location of that fixed line. If, however, the handset includes a cell phone (cellular radio access technology), the provider can determine a coarse location of the handset using the position of the cell transmitter currently communicating with the cell phone. With the location of the handset or cell transmitter close to the handset known, the provider can quickly connect the user to the most appropriate PSAP.

When communicating via a WLAN (e.g., using VoIP services), however, it can be extremely difficult for a service provider to determine a location of the WLAN device. The WLAN device may be connected to the service provider using a WLAN network connection in a first country while the service provider resides in another country. In other cases, the WLAN device may be connected to the service provider through one or more proxies or networks having complicated architectures and using IP addresses that are dynamic and constantly changing. Furthermore, for privacy reasons, in several locations it is illegal to retrieve accurate location information from a WLAN device. As a result, when a WLAN device connects to a service provider, the geographical location of the WLAN device cannot be easily determined. Because it is difficult to determine the location of the WLAN device, the service provider cannot easily ensure that any emergency calls are routed to the most appropriate local PSAP.

To assist the service provider in determining the most appropriate local PSAP (and, consequently, the most appropriate emergency contact number) for a particular WLAN device, existing WLAN systems allow for the updating of emergency call dial-strings, within a WLAN device, from the hotspot prior to the establishment of a user session. Because the hotspot is resident at a fixed location, the hotspot may be provided with the telephone number of an appropriate, geographically close PSAP or a centralized service to be used in the case of an emergency. After receiving the emergency contact number from the hotspot, if the user wishes to make an emergency call, an "emergency" button on the WLAN device is pressed or an emergency number is dialed and the device retrieves the provisioned emergency contact number from a memory. In some cases, multiple emergency numbers may be provided for different emergency services. In that case, the WLAN device may provide multiple emergency buttons for accessing each of the services. After retrieving the emergency contact number, the WLAN device connects to the PSAP identified by the number and the user can place the emergency call. Because the number for the PSAP was retrieved from the WLAN hotspot, the number identifies a local PSAP that can efficiently alert local services to provide assistance.

Existing network configurations, however, are only configured to provision regional emergency call number dial string information. Future, next-generation, 911 services, require that multimedia emergency services be enabled for WLAN devices. Multimedia emergency services would allow a user to make, in addition to emergency phone calls, emergency video calls, or to send emergency text messages, for example.

Existing WLAN systems are unable to distribute the emergency contact and routing information necessary for a subscriber to access those services.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
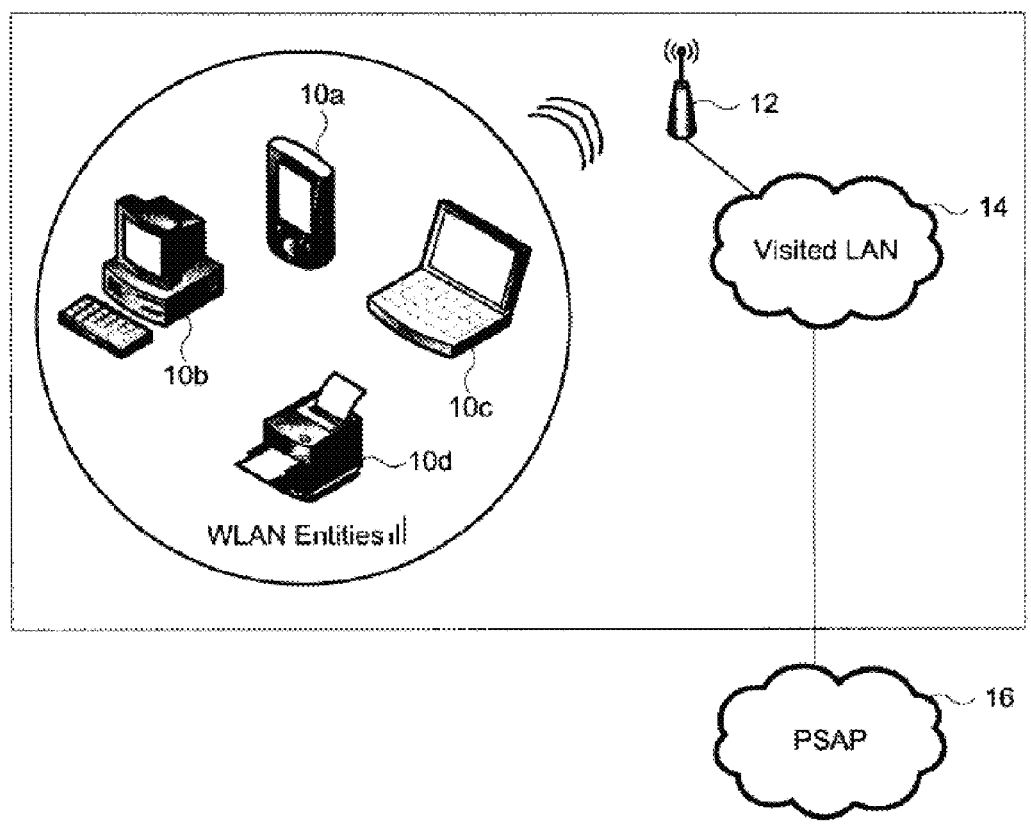
FIG. 1 is an illustration of an example network architecture for emergency call provisioning within a wireless local area network (WLAN)

The present disclosure relates generally to emergency access in communication networks and more specifically to a system and method for provisioning multimedia emergency access contact information in a wireless network.

To this end, some embodiments include a method for distributing multimedia emergency contact information using an access point of a wireless local area network (WLAN). The access point is configured to retrieve contact information from a lookup table. The lookup table includes contact information for a plurality of services. The method includes receiving a first generic advertisement service (GAS) query from a WLAN device using the WLAN network. The first GAS query includes a uniform resource name (URN) identifying at least one of the services in the lookup table of the access point. The method includes retrieving contact information for the at least one of the services identified in the first GAS query. The contact information includes a uniform resource identifier (URI). The URI being configured to include session initiation protocol (SIP) URIs, and telephone URIs. The method includes transmitting a GAS query response to the WLAN device, the GAS query response including the contact information for the at least one of the services identified in the first GAS query.

Another embodiment includes a method for distributing emergency contact information using a wireless local area network (WLAN). The WLAN is configured to retrieve contact information from a lookup table. The lookup table includes contact information for a plurality of services. The method includes receiving a query from a WLAN device using the WLAN network. The query identifies at least one of the services in the lookup table. The method includes retrieving contact information for the service identified in the query. The contact information includes a uniform resource identifier (URI). The URI is configured to include session initiation protocol (SIP) URIs, telephone URIs, and multimedia URIs. The method includes transmitting a query response to the WLAN device. The query response includes the contact information for the service identified in the query.

Another embodiment includes a method for retrieving multimedia emergency contact information using a wireless local area network (WLAN) device in communication with an access point of a WLAN. The access point is configured to retrieve contact information from a lookup table. The lookup table includes contact information for a plurality of services. The method includes transmitting a generic advertisement service (GAS) query to the access point of the WLAN network, and receiving a GAS query response from the access point. The GAS query response including contact information for a service. The contact information includes a uniform resource identifier (URI).

Another embodiment includes a wireless local area network (WLAN) device for retrieving multimedia emergency contact information from an access point of a WLAN. The access point is configured to retrieve contact information from a lookup table. The lookup table includes contact information for a plurality of services. The WLAN device includes a processor. The processor is configured to transmit a generic advertisement service (GAS) query to the access point of the WLAN network. The GAS query includes a uniform resource name (URN) identifying at least one of the services in the lookup table of the access point. The processor is configured to receive a GAS query response from the access point. The GAS query response includes contact information for the service identified in the GAS query. The contact information includes a uniform resource identifier (URI). The URI is configured to include session initiation protocol (SIP) URIs, telephone URIs, and multimedia URIs.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Existing network configurations are only configured for the provisioning of local emergency call number dial string information. To provide multimedia emergency services (often accessed using the Internet), additional addressing and routing information for the emergency services must be provided to the WLAN device connected to a service provider. In existing networks, however, the current emergency call number dial-string cannot provide this information. Although a protocol such as the IETF Location to Service Translation (LoST) protocol may be used to provision some of the necessary information, such an implementation may, in some cases, require full authentication or registration of a WLAN device with a WLAN hotspot after a user session has been created (e.g. an IP session must be established), resulting in an inefficient and burdensome contact information distribution process.

The present system and method allows for the enablement of multimedia emergency services for WLAN devices and other wireless network communication devices. For example, the present system may operate in accordance with the requirements of future, next-generation, 911 services, such as NG911. Multimedia emergency services allow a user to make, in addition to emergency phone calls, emergency video calls, and send emergency text messages or multimedia messages, for example. To provide these multimedia emergency services, additional addressing and routing information for the emergency services is provided to the network (e.g., a WLAN) and may be distributed by one or more hotspot. The additional addressing and routing information may then be retrieved by WLAN devices in communication with the hotspot. Depending upon the network implementation, the information may be retrieved prior to an association between the WLAN device and the hotspot (e.g., before session establishment or registration of the WLAN device). In this way, the WLAN device can be provisioned with correct emergency information.

FIG. 1 is an illustration of an exemplary network architecture for emergency call provisioning within a WLAN. The WLAN may be configured using Institute of Electrical and Electronics Engineers (IEEE) Standard 802.11 (IEEE 802.11) technology, or Bluetooth (IEEE 802.15.1), Zigbee (IEEE 802.15.4), Metropolitan Area Network (IEEE 802.16, IEEE 802.20), Regional Area Network (IEEE 802.22) and/or cellular systems, or other standards or networks for providing wireless network communications, for example. Referring to FIG. 1, various WLAN devices 10a-10d may be configured to connect to and communicate using WLAN access point (AP) 12 to provide voice communications. WLAN 14, in turn, is configured to communicate with public safety answering point (PSAP) 16. PSAP 16 represents a PSAP local to AP 12 than can dispatch various services to the geographical region surrounding WLAN AP 12 and in which WLAN devices 10a-10d reside.

In the network configuration shown in FIG. 1, when a WLAN device connects to WLAN 14, AP 12 provides the WLAN device with the emergency contact information for PSAP 16. In the event of an emergency, the WLAN device can initiate an emergency phone call to PSAP 16 using the provided contact information. Because the contact information is retrieved from a local hotspot, the emergency contact information retrieved from the hotspot identifies a local PSAP regardless of whether the WLAN device has moved location. In some cases, the WLAN device may hide the emergency contact information by assigning the contact information to an emergency application or an emergency button provided on the device.

Figure 2:
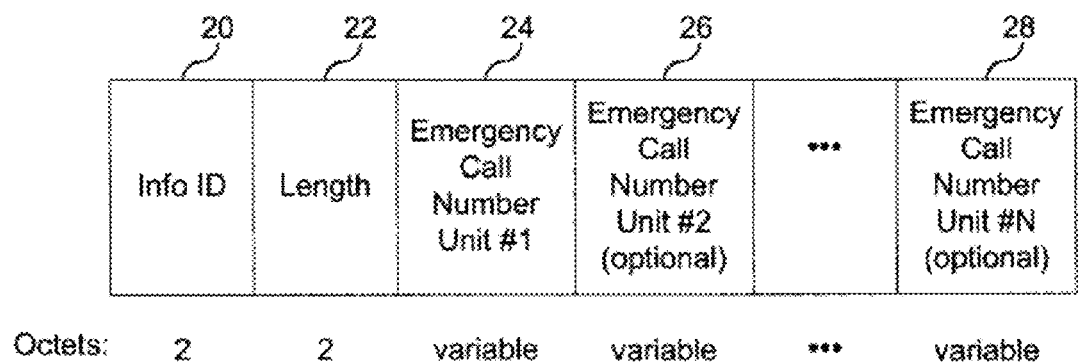
FIG. 2 is an illustration showing formatting information for emergency call information data to be distributed by an access point of a wireless communication network.

In existing networks, the emergency call information may only include telephone numbers to be distributed by the network access point. Generally, the emergency call information provides a list of emergency phone numbers to call a particular PSAP that serves a specific geographical area. FIG. 2 is an illustration showing formatting information for emergency call information data to be distributed by an access point of a wireless communication network. With reference to FIG. 2, info ID field 20 includes a value indicating that the type of data being transferred includes Emergency Call Number information and length field 22 stores the length of the Emergency Call Number Information. As the Emergency Call Number information may include multiple contact numbers, the length may vary. Emergency Call Number Unit #1 field 24 stores the first Emergency Call Number to be transferred from the access point to the wireless device. Additional, optional, Emergency Call Numbers may be provided in fields 26 and 28.

Figure 3:
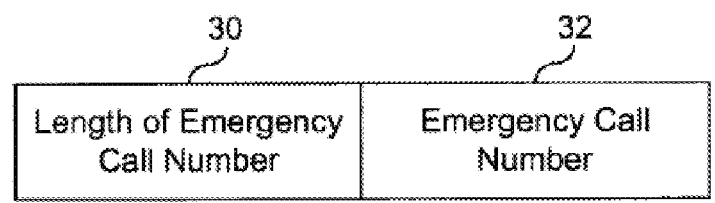
FIG. 3 is an illustration showing formatting information for the Emergency Call Number that may be included in the data package illustrated in FIG. 2.

FIG. 3 is an illustration showing formatting information for the Emergency Call Number information that may be included in the data package illustrated in FIG. 2. As shown in FIG. 3, each Emergency Call Number is defined by length field 30 that specifies the length of the Emergency Call Number. The Emergency Call Number is then stored in field 32. The Emergency Call Number field includes the dialing digits used to obtain emergency services from the network and may be encoded using the UTF-8 character set, defined in RFC 3629, for example.

Using the data structure illustrated in FIGS. 2 and 3, wireless communication networks may be configured to distribute emergency call number information to one or more devices in communication with the network. Such a configuration, however, does not allow for the distribution of contact information for the provisioning of multimedia emergency services.

The present system and method may be used to extend the layer 2 Generic Advertisement Service (GAS) query illustrated in FIGS. 2 and 3 to allow richer data to be exchanged and for providing contact information for multimedia emergency services. For example, the present system may replace dial-string (character) fields with a URN and/or a URI field to communicate multimedia emergency contact information between an access point or hotspot of a network and a device in communication with the network.

In some wireless networks, such as those configured in accordance with standards such as those described in the IEEE 802.11u standards documents or other networks configured in accordance with IEEE 802.11u where interworking is enabled, before a WLAN device can connect to the network and communicate using the network, the WLAN device may first go through an authentication, association, and, in some cases, a registration process. The authentication process may be used to verify that the WLAN device is authorized to use the network and may be completed before the WLAN device is able to use the network to communicate. The association process is used to join the network. The registration may be required based upon the user's relationship with an external network (e.g. [sic-missing comma] hotspot roaming agreements). Based upon that relationship, the network may indicate that online authentication or registration is possible, or only allow access to a strictly limited set of services, such as emergency services.

When a WLAN device first tries to connect to a particular network, prior to the authentication, association, or registration processes, the WLAN device may use a discovery mechanism such as a layer 2 network discovery mechanism (e.g. GAS) to identify the available network and initiate communication with the network. After identifying a candidate network, prior to authentication and/or registration as part of network discovery, the layer 2 network discovery mechanism with the WLAN device may be configured to transmit a request for multimedia emergency contact information. The request is sent by the WLAN device as a query response mechanism from the WLAN device to the hotspot access point—the device with which the initial network connection is made. In response, the access point sends multimedia emergency contact information back to the WLAN device.

In some cases, because the emergency contact information may be received prior to an optional authentication, association, and/or registration process, there may be some uncertainty that the emergency contact information is accurate and that it has not been provided by a malicious third party. Accordingly, in some cases after establishing a session on the network (for example, by completing an authentication, association and/or registration process or otherwise establishing a session on an open network such as one having an open Service Set Identifier (SSID), in which case the WLAN device does not need to authenticate or register), the WLAN device may again request the emergency contact information. In that case, the WLAN device can verify that the emergency contact information is accurate.

In one implementation of the present system, after detecting a suitable candidate network, the WLAN device initiates the process of retrieving multimedia emergency contact information from the access point. To retrieve the multimedia emergency contact information, the WLAN device first transmits to the access point a GAS query including uniform resource name (URN) data specifying the requested emergency contact information. The URN data may be configured as a URN Service Label (e.g. "sos.ambulance") and allows the access point to return the emergency contact information associated with the requested service. In some cases the request may not specify a particular URN. In that case, the blank URN field may represent a wild card character indicating that the WLAN device wishes to retrieve all supported multimedia emergency contact information. Furthermore, various wild cards may be defined allowing a single URN to refer to several multimedia emergency contacts.

In accordance with the present disclosure, the emergency contact information sent from the access point to the WLAN device may include a universal resource indicator (URI) for the requested service. The URI data includes a URI allowing a user to connect to the requested service (e.g. "sip:+15555551002@fire.com") and is accessible using the network connected to the access point.

Figure 4:
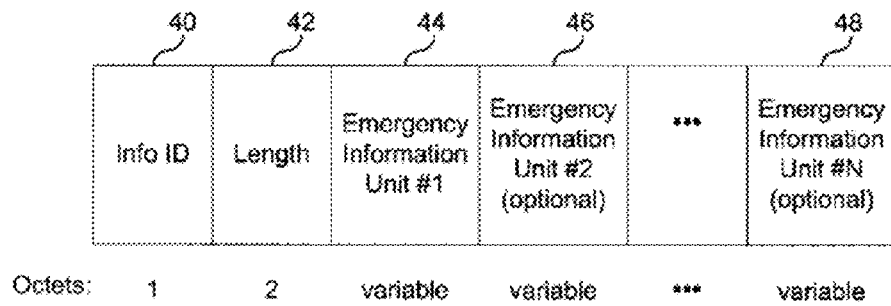
FIG. 4 shows example formatting for a query response containing emergency multimedia contact information for distribution using a wireless communication network.

In one implementation of the present system, the URI data is encoded in the GAS query response in accordance with the data structure illustrated in FIG. 4. FIG. 4 shows example formatting for a query response containing emergency multimedia contact information for distribution using a wireless communication network. Specifically, FIG. 4 illustrates a layer 2 GAS query (e.g., as described in the Institute of Electrical and Electronics Engineers (IEEE) Standard 802.11) that may be used for communicating emergency multimedia contact information in accordance with the present disclosure. The query includes info ID field 40 that may include a value corresponding to "Emergency Call Information" and that is used to identify the payload of the query as containing emergency contact information. Length field 42 may include a 2-octet field having a value equal to the number and size of the Emergency Information Units that contain the emergency contact URIs. Emergency Information Unit #1 field 44 stores emergency contact information and may include telephone numbers, URIs, or other contact information for emergency services. Additional, optional, Emergency Information Units may be provided in fields 46 and 48, etc. Each of the "Emergency Information Unit" fields 44-48 may be encoded in accordance with FIG. 5.

Figure 5:
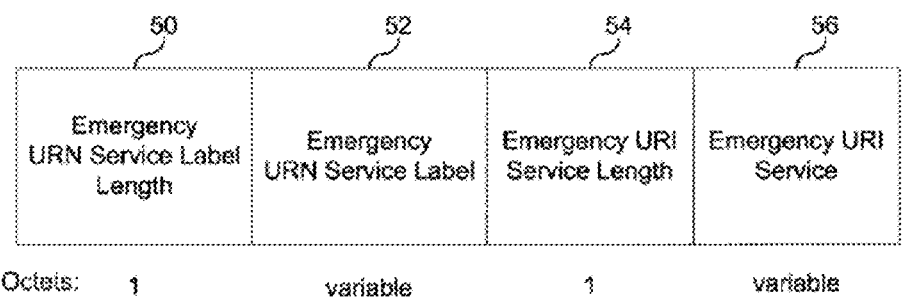
FIG. 5 is an illustration showing formatting information for the Emergency Information Units of FIG. 4.

FIG. 5 is an illustration showing formatting information for the Emergency Information Units of FIG. 4. With reference to FIG. 5, each of the Emergency Information Units includes an Emergency URN Service Label Length field 50. Length field 50 is a one octet field and has a value determined by the size of the Emergency URN Service Label field 52. Emergency URN Service Label field 52 includes a value that indicates the emergency service type for which contact information is being provided. Emergency URN Service Label field 52 may be encoded using the UTF-8 character set, defined in RFC 3629 in UTF-8, "a transformation format of ISO 10646", RFC 3629, November 2003. For example, Emergency URN Service Label field 52 may have a value indicating various emergency service types such as "sos.ambulance", "sos.animal-control", "sos.fire", "sos.gas", "sos.marine", "sos.mountain", "sos.physician", "sos.poison", "sos.enterprisesecurity", or "sos.police". Various available emergency service types may be defined by the Internet Assigned Numbers Authority (IANA), for example.

Emergency URI Service length field 54 may include a one octet field having a value determined by the size of Emergency URI Service field 56. Emergency URI Service field 56 includes the contact information for the emergency service corresponding to that provided in Emergency URN Service Label field 51 and may include addressing or Internet routing information. In some cases, however, the network may be implemented as a private Intranet that may still be required to provide emergency contact information. In that case, rather than include Internet routing information, Emergency URN Service Label field 51 may include Intranet routing information providing contact information for local emergency services such as those provided by a private security or emergency response service. Emergency URI Service field 56 may be encoded using the UTF-8 character set.

Emergency URI Service field 56 may be encoded as a telephone number URI as defined in RFC 3966 (see, for example, "The tel URI for Telephone Numbers", RFC 3966, December 2004) or a SIP URI as defined in RFC 3969 (see, for example, "The Internet Assigned Number Authority (IANA) Uniform Resource Identifier (URI) Parameter Registry for the Session Initiation Protocol (SIP)", RFC 3969, December 2004) and RFC 4458 (see, for example, "Session Initiation Protocol (SIP) URIs for Applications", RFC 4458, April 2006). In one example, the telephone URI may be expressed as "tel:911", while a SIP URI may be expressed as "sip:+15555551002@fire.com". As additional URI formats are defined and implemented, the Emergency URI Serviced field 56 may be extended to use those URI formats to refer to and identify emergency services.

Figure 6:
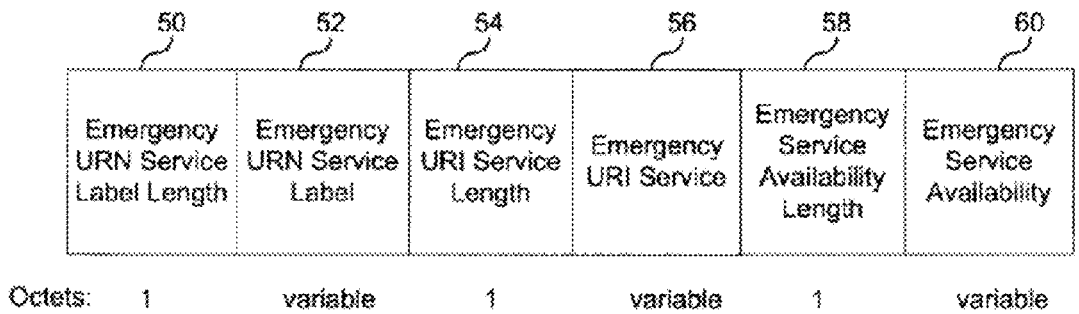
FIG. 6 is an illustration showing formatting information for the Emergency Information Units of FIG. 4 including information elements for describing a period of availability of the emergency service.

In addition, the emergency contact or URI information may also contain a separate "availability field" that includes a formatted date and time indicating a period of availability of the service identified by the emergency contact information (e.g., a volunteer fire service, which is not available on Sundays, or a lifeguard service which is only available through the summer months). FIG. 6 is an illustration showing formatting information for the Emergency Information Units of FIG. 4 including information elements for describing a period of availability of the emergency service. As shown in FIG. 6, an Emergency Service Availability Length 58 is provided for specifying a length of the information describing the period of availability. Emergency Service Availability 60 is a variable length field that stores data describing the period of availability of the emergency service.

Alternatively, a new layer 2 query entitled "Emergency URN Information" may be created in accordance with IEEE 802.11 GAS to allow a WLAN device to request contact information for multimedia emergency services in accordance with the present disclosure. The layer 2 query is provided in addition to existing "Emergency Call Number" query, as described above and illustrated in FIGS. 2 and 3. The layer 2 query may use the protocol elements illustrated in FIGS. 4 and 5 and described above to identify and provide contact information for the requested services. The format of the query is illustrated in FIG. 4, while the format of the Emergency Service Information Unit elements is illustrated in FIG. 5. In this implementation, the layer 2 query may be associated with a new query/response info ID value indicating that the query includes "Emergency URN Information". Table 1 illustrates contents of such a query. The query includes separate and distinct information elements for providing both Emergency Call Number Information and Emergency URN Information.

TABLE 1

| Info Name | Info ID | Native Info Element (clause) |
|---|---|---|
| Reserved | 0-255 | n/a |
| Capability List | 256 | 7.3.4.1 |
| Venue Name information | 257 | 7.3.4.2 |
| Emergency Call Number information | 258 | 7.3.4.3 |
| Emergency URN Information | 259 | 7.3.4.4 |
| Network Authentication Type information | 260 | 7.3.4.5 |
| Roaming Consortium List | 261 | 7.3.4.6 |
| IP Address Type Availability information | 262 | 7.3.4.8 |
| NAI Realm List | 263 | 7.3.4.9 |
| 3GPP Cellular Network information | 264 | 7.3.4.10 |
| AP Geospatial Location | 265 | 7.3.4.11 |
| AP Civic Location | 266 | 7.3.4.12 |

TABLE 1-continued

| Info Name | Info ID | Native Info Element (clause) |
|---|---|---|
| Domain Name List | 267 | 7.3.4.13 |
| Emergency Alert URI | 268 | 7.3.4.14 |
| Reserved | 269-56796 | n/a |
| Native Query Protocol vendor-specific list | 56797 | 7.3.4.7 |
| Reserved | 56798-65535 | n/a |

To ensure that the access point has accurate emergency contact information, the access point must be first be provisioned with multimedia emergency contact information by a service provider. Accordingly, prior to WLAN device use the access point for the network can be provisioned with the emergency URI address information for local and/or regional emergency services, depending upon those available. The information may be stored within a lookup table accessible to the access point and may be indexed using the Emergency URN Service Label information. The corresponding Emergency URI Service may then be returned when a WLAN device connects to the network serviced by the access point and requests the information. In some cases, in addition to emergency URI information, the access point may be provisioned with contact information for other services that may be of interest. For example, the access point may be provisioned with contact information for counseling services having URNs of "counseling.children", "counseling.mental-health", and "counseling. suicide". Additional contact information may be provided for local services, such as those with the URNs "local.restaurant", "local.traffic-information", "local-.hotel-reservations", etc. As such, an access point for a network may be provisioned with a directory of contact information for many services and resources including emergency and non-emergency services and resources, the directory including telephone number URIs and SIP URIs.

In one example GAS query, the Emergency Information Unit #1 may be assigned several values that are each indicative of the data type to be returned to the WLAN device. For example, if the Emergency Information Unit #1 is blank, that may indicate that the WLAN device requests all emergency URN/URI pairs. In one case, this is the default behavior to ensure that the WLAN device is provisioned with emergency contact information. If, however, the Emergency Information Unit #1 has a value of a particular URN, that may indicate that the WLAN device requests the emergency contact information URI associated with the URN. If, however, the Emergency Information Unit #1 has a value of "nes", for example, that may indicate that the WLAN device requests all the non-emergency service URN/URIs. If the Emergency Information Unit #1 has a value of "all", that may indicate that the WLAN device requests all URN/URIs.

Depending upon the system implementation, the emergency contact information may be provisioned to the access point using a set of management information base (MIB) variables at the access point. Alternatively, a WLAN manager tool may be used at the access point to communicate the emergency URI address information. In another implementation, the emergency URI address information is provisioned by means of auto-configuration using a protocol such as "Location-to-Service Translation" Protocol (LoST). In that case, the LoST protocol may provide a resolution system for mapping service URNs to URIs based upon geographic location. The protocol may be exercised at the access point power up, manually operated (e.g., through a WLAN manager), or operated on a periodic basis. The auto-configuration may not only allow the updating of the URIs in the Emergency URN Service Label Table of the access point hotspot, but also the addition/deletion of URN Service Label entries as emergency service infrastructure changes over time.

Table 2 illustrates an example Emergency URN Service Label Table (as typically configured within an access point) with example URIs that may be used in accordance with the present disclosure. As shown, the access point may be provisioned with emergency contact information for several services and/or resources. The contact information includes URIs and may take the form of tel URIs containing telephone numbers and http URIs containing web addresses, and SIP URIs.

TABLE 2

| Emergency URN Service Label | URI |
| --- | --- |
| sos.ambulance | tel:112;sip:+15555551002@ambulance.com |
| sos.animal-control | http:01794552099 |
| sos.fire | tel:112;sip:+15555551002@fire.com |
| sos.gas | tel:2995 |
| sos.marine | sip:+15555551002@coast.com |
| sos.mountain | sip:+15555551002@fire.com |
| sos.physician | tel:02380733000;sip:+2777744@control.com |
| sos.poison | tel:02380733001 |
| sos.police | tel:112;sip:+15555551002@police.com |
| sos.enterprisesecurity | tel:2222;sip:+2222@rim.com |

Table 2 shows that the entries may include URIs of various media (e.g., SIP for VoIP, tel for telephony and http for web access), together with local dial-string codes (long numbers) and regional dial-string codes (short numbers). Some of the services provide alternative URIs providing a choice of media within the WLAN device. The sos.enterprisesecurity value may be included for Intranet network implementations to provide for the distribution of emergency contact information for specialized emergency services such as a private security, emergency, or fire response services. For example, some large facilities may, because of their size, or special requirements (e.g., working with extremely dangerous chemicals) establish their own emergency response services. In that case, sos.enterprisesecurity may include the emergency contact information for those services.

Figure 7:
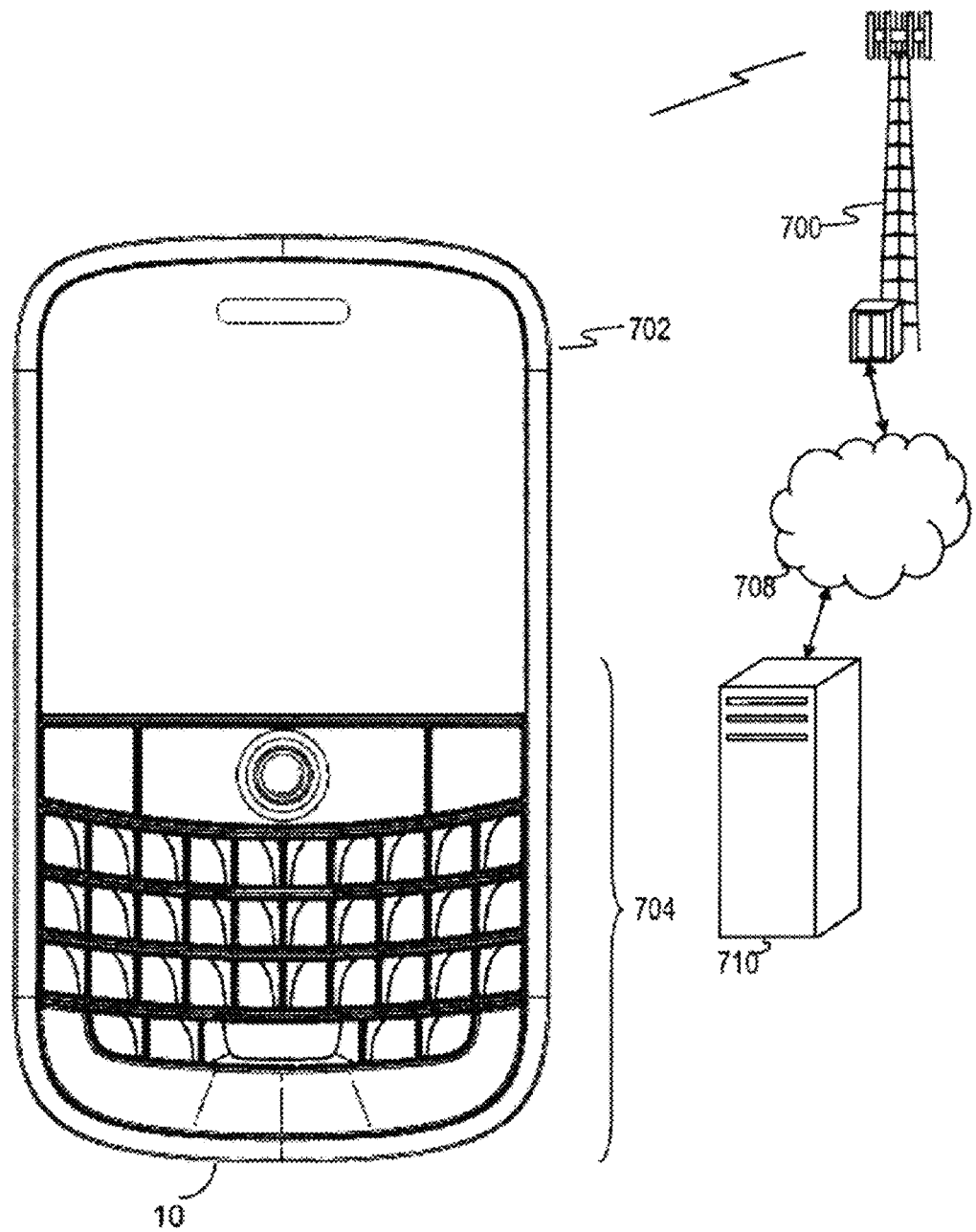
FIG. 7 illustrates a wireless communications system including an embodiment of a WLAN device.

FIG. 7 illustrates a wireless communications system including an embodiment of a WLAN device 10. WLAN device 10 is operable for implementing aspects of the disclosure, but the disclosure should not be limited to these implementations. Though illustrated as a mobile handset, WLAN device 10 may take various forms including a wireless handset, a pager, a personal digital assistant (PDA), a portable computer, a tablet computer, a laptop computer. Many suitable devices combine some or all of these functions. In some embodiments of the disclosure, WLAN device 10 is a special-purpose communications device such as a mobile phone, a wireless handset, a pager, a PDA, or a telecommunications device installed in a vehicle. WLAN device 10 may also be a device, include a device, or be included in a device that has similar capabilities but that is not transportable, such as a desktop computer, a set-top box, or a network node. WLAN device 10 includes a display 702 and user input interface 704 that may include a touch-sensitive surface, a keyboard or other input keys.

WLAN device 10 is configured to communicate with a wireless network access node, or access point of wireless communications network or system 700. The network 700 may be coupled to a wired network 708 that may include server 710.

Figure 8:
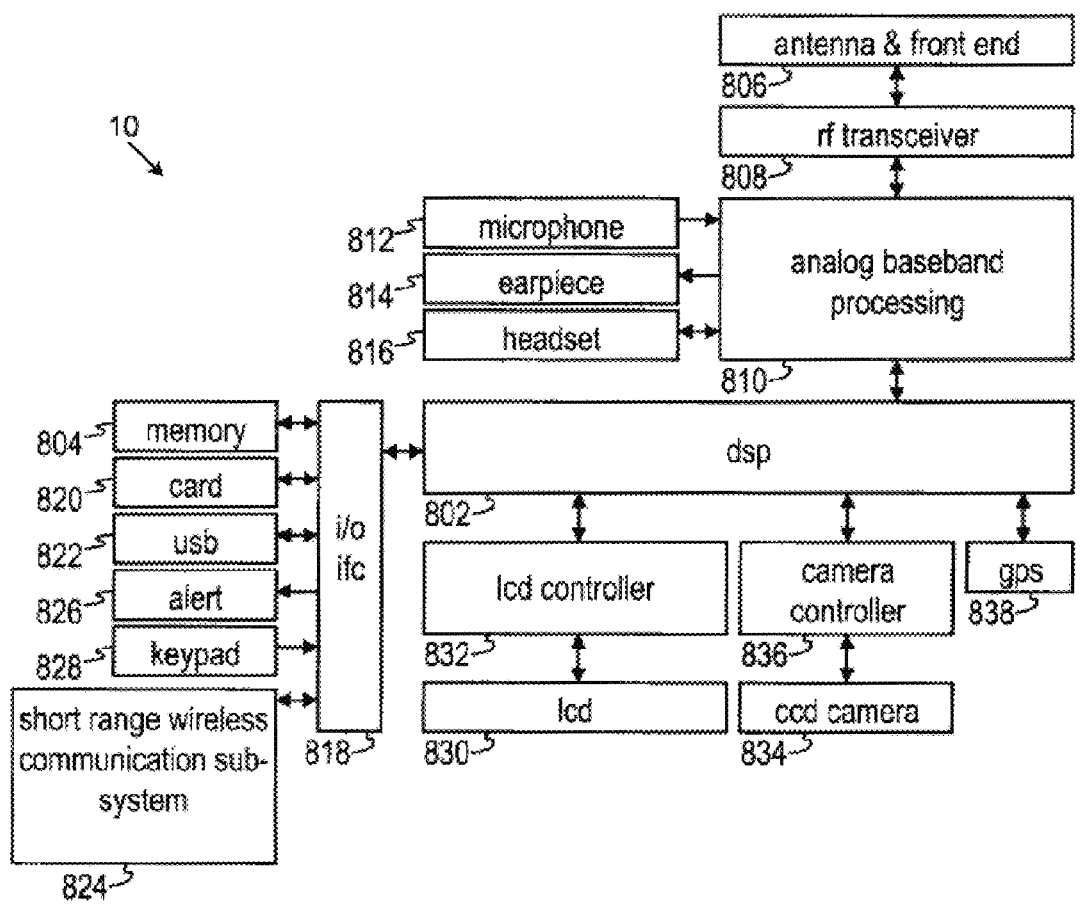
FIG. 8 is a block diagram of a WLAN device operable for some of the various embodiments of the disclosure.

FIG. 8 shows a block diagram of the WLAN device 10. While a variety of known components of WLAN devices 110 are depicted, in an embodiment a subset of the listed components and/or additional components not listed may be included in the WLAN device 10. WLAN device 10 includes a digital signal processor (DSP) 802 and a memory 804. As shown, WLAN device 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the WLAN device 10 may include another kind of display that does not provide a touch sensitive screen. In an embodiment, the DSP 802 may communicate directly with the memory 804 without passing through the input/output interface 818.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application or a complementary code keying (CCK) application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the WLAN device 10 and may also enable the WLAN device 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the WLAN device 10 to communicate wirelessly with other nearby mobile devices and/or wireless base stations.

The input/output interface 818 may further connect the DSP 802 to the alert 826 that, when triggered, causes the WLAN device 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

Figure 9:
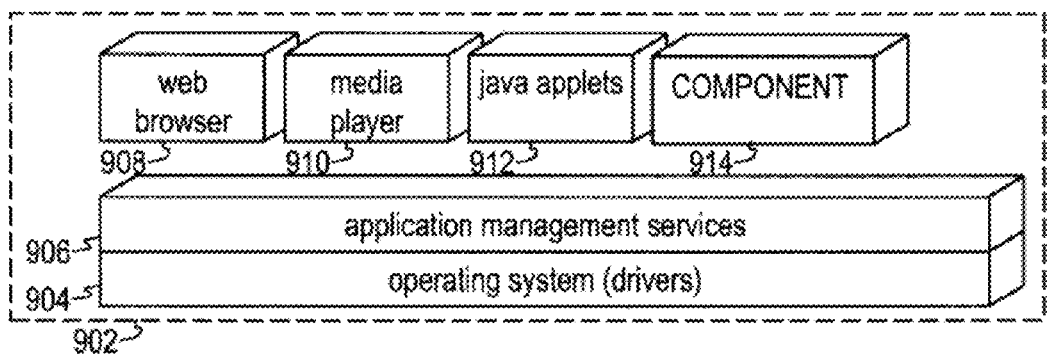
FIG. 9 is a diagram of a software environment that may be implemented on a WLAN device operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the WLAN device hardware with standardized interfaces that are accessible to application software. The operating system drivers 904 include application management services ("AMS") 906 that transfer control between applications running on the WLAN device 10. Also shown in FIG. 9 are a web browser application 908, a media player application 910, and Java applets 912. The web browser application 908 configures the WLAN device 10 to operate as a web browser, allowing a user to enter information into forms and select links to retrieve and view web pages. The media player application 910 configures the WLAN device 10 to retrieve and play audio or audiovisual media. The Java applets 912 configure the WLAN device 10 to provide games, utilities, and other functionality. A component 914 might provide functionality described herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made.

The invention claimed is:

1. A non-transitory computer readable medium storing instructions executable by a programmed processor for distributing multimedia emergency contact information in a wireless local area network (WLAN), the storage medium comprising instructions operative for:
   receiving, prior to authentication of a wireless device with the WLAN, a generic advertisement service (GAS) request from the wireless device, the GAS request requesting emergency contact information; and
   transmitting a GAS response in response to the GAS request, the GAS response including the requested emergency contact information which includes a uniform resource name (URN) emergency service label.

2. The computer readable medium of claim 1, wherein the URN emergency service label is indicative of a type of emergency service.

3. The computer readable medium of claim 1, wherein the URN emergency service label includes "sos.fire".

4. The computer readable medium of claim 1, wherein the GAS request includes an information identifier (ID) indicative of a request for the emergency contact information.

5. The computer readable medium of claim 4, wherein the GAS response includes the information ID.

6. A non-transitory computer readable medium storing instructions executable by a programmed processor in a wireless device, the storage medium comprising instructions operative for:
   transmitting, prior to authentication of the wireless device with a wireless local area network (WLAN), a generic advertisement service (GAS) request requesting emergency contact information; and
   receiving a GAS response in response to the GAS request, the GAS response including the requested emergency contact information which includes a uniform resource name (URN) emergency service label.

7. The computer readable medium of claim 6, wherein the URN emergency service label is indicative of a type of emergency service.

8. The computer readable medium of claim 6, wherein the URN emergency service label includes "sos.fire".

9. The computer readable medium of claim 6, wherein the GAS request includes an information identifier (ID) indicative of a request for the emergency contact information.

10. The computer readable medium of claim 9, wherein the GAS response includes the information ID.

11. A non-transitory computer readable medium storing instructions executable by a programmed processor in an access point within a wireless local area network (WLAN), the storage medium comprising instructions operative for:
    receiving, prior to authentication of a wireless device with the WLAN, a generic advertisement service (GAS) request from the wireless device, the GAS request requesting emergency contact information; and
    transmitting a GAS response in response to the GAS request, the GAS response including the requested emergency contact information which includes a uniform resource name (URN) emergency service label.

12. The computer readable medium of claim 11, wherein the URN emergency service label is indicative of a type of emergency service.

13. The computer readable medium of claim 11, wherein the URN emergency service label includes "sos.fire".

14. The computer readable medium of claim 11, wherein the GAS request includes an information identifier (ID) indicative of a request for the emergency contact information.

15. The computer readable medium of claim 14, wherein the GAS response includes the information ID.

* * * * *